US009507087B2

(12) United States Patent
Park et al.

(10) Patent No.: US 9,507,087 B2
(45) Date of Patent: Nov. 29, 2016

(54) WAVELENGTH COMBINER UNIT AND ARRAYED WAVEGUIDE GRATING HAVING THE SAME

(71) Applicant: ELECTRONICS AND TELECOMMUNICATIONS RESEARCH INSTITUTE, Daejeon (KR)

(72) Inventors: Jaegyu Park, Daejeon (KR); Myungjoon Kwack, Gimpo (KR); Gyungock Kim, Daejeon (KR); Jiho Joo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/826,869

(22) Filed: Aug. 14, 2015

(65) Prior Publication Data

US 2016/0223745 A1    Aug. 4, 2016

(30) Foreign Application Priority Data

Jan. 30, 2015  (KR) ................... 10-2015-0015277

(51) Int. Cl.
*G02B 6/12*    (2006.01)
*G02B 6/122*   (2006.01)
*G02B 6/125*   (2006.01)

(52) U.S. Cl.
CPC .......... *G02B 6/12014* (2013.01); *G02B 6/125* (2013.01); *G02B 6/12016* (2013.01); *G02B 6/12026* (2013.01); *G02B 6/1228* (2013.01); G02B 2006/12097 (2013.01)

(58) Field of Classification Search
CPC .......... G02B 6/12014; G02B 6/12016; G02B 6/12026; G02B 6/1228; G02B 6/125; G02B 2006/12097
See application file for complete search history.

(56) References Cited

U.S. PATENT DOCUMENTS

| | | | | | |
|---|---|---|---|---|---|
| 4,557,553 | A | * | 12/1985 | McLandrich | G02B 6/29332 359/900 |
| 5,173,747 | A | * | 12/1992 | Boiarski | G01N 21/45 356/128 |
| 5,195,162 | A | * | 3/1993 | Sultan | G01D 5/268 356/614 |
| 5,333,000 | A | * | 7/1994 | Hietala | H01Q 3/2676 342/368 |
| 5,559,912 | A | * | 9/1996 | Agahi | G02F 1/3133 385/131 |
| 5,563,970 | A | * | 10/1996 | Little | G02F 1/3132 385/42 |
| 5,706,377 | A | * | 1/1998 | Li | G02B 6/12016 385/14 |
| 6,236,781 | B1 | * | 5/2001 | Doerr | G02B 6/12016 385/24 |
| 6,272,268 | B1 | * | 8/2001 | Miller | G02B 6/0285 385/126 |
| 6,462,349 | B1 | * | 10/2002 | Hsieh | G01B 11/14 250/234 |
| 6,522,805 | B1 | * | 2/2003 | Luff | G02B 6/12007 385/14 |
| 6,587,609 | B2 | * | 7/2003 | Lee | G02B 6/12011 385/129 |

(Continued)

*Primary Examiner* — Peter Radkowski (57) ABSTRACT

Provided is a wavelength combiner including a slab waveguide; an output waveguide extended from the slab waveguide in a first direction; and at least one rib waveguide disposed at an interval horizontally from the output waveguide and extended from the slab waveguide in the first direction, wherein the rib waveguide is tapered in the first direction.

17 Claims, 6 Drawing Sheets

(56) References Cited

U.S. PATENT DOCUMENTS

| | | | | |
|---|---|---|---|---|
| 6,690,861 B2* | 2/2004 | Yoneda | G02B 6/12016 | 385/37 |
| 6,798,948 B2* | 9/2004 | Delisle | G02B 6/12004 | 385/33 |
| 6,798,952 B2* | 9/2004 | Naruse | G02B 6/12011 | 385/130 |
| 6,810,180 B2* | 10/2004 | Yoneda | G02B 6/12016 | 385/10 |
| 6,826,334 B2* | 11/2004 | Yoneda | G02B 6/12016 | 385/10 |
| 6,917,730 B2* | 7/2005 | Ghiron | G02B 6/12 | 385/129 |
| 6,950,581 B2* | 9/2005 | Bandyopadhyay | G02B 6/122 | 385/30 |
| 6,956,993 B2* | 10/2005 | Bernasconi | G02B 6/12016 | 385/37 |
| 7,302,138 B2* | 11/2007 | Lu | G02B 6/12016 | 385/129 |
| 7,315,697 B2* | 1/2008 | Smilanski | H04B 10/2543 | 398/183 |
| 7,403,688 B2* | 7/2008 | Knox | G02B 6/02247 | 385/122 |
| 7,515,790 B2* | 4/2009 | Choi | B82Y 20/00 | 359/831 |
| 7,609,918 B2* | 10/2009 | Narevicius | G02B 6/12007 | 385/28 |
| 8,086,105 B2* | 12/2011 | Shin | G02B 6/12016 | 398/79 |
| 8,189,972 B2* | 5/2012 | Little | G02B 6/12007 | 385/15 |
| 8,787,712 B2* | 7/2014 | Grondin | B82Y 20/00 | 385/14 |
| 9,151,901 B2* | 10/2015 | Okayama | G02B 6/354 | |
| 2001/0033714 A1* | 10/2001 | Delisle | G02B 6/12004 | 385/33 |
| 2002/0067890 A1* | 6/2002 | Yoneda | G02B 6/12016 | 385/37 |
| 2002/0196509 A1* | 12/2002 | Smilanski | H04B 10/2543 | 398/194 |
| 2003/0035612 A1* | 2/2003 | Lee | G02B 6/12011 | 385/16 |
| 2003/0103722 A1* | 6/2003 | Naruse | G02B 6/12011 | 385/24 |
| 2004/0013357 A1* | 1/2004 | Bandyopadhyay | G02B 6/122 | 385/30 |
| 2004/0067019 A1* | 4/2004 | Yoneda | G02B 6/12016 | 385/37 |
| 2004/0096158 A1* | 5/2004 | Yoneda | G02B 6/12016 | 385/37 |
| 2004/0213518 A1* | 10/2004 | Ghiron | G02B 6/12 | 385/36 |
| 2004/0264857 A1* | 12/2004 | Bernasconi | G02B 6/12016 | 385/37 |
| 2005/0254750 A1* | 11/2005 | Narevicius | G02B 6/12007 | 385/28 |
| 2006/0159398 A1* | 7/2006 | Knox | G02B 6/02247 | 385/43 |
| 2007/0071388 A1* | 3/2007 | Lu | G02B 6/12016 | 385/37 |
| 2008/0112669 A1* | 5/2008 | Choi | B82Y 20/00 | 385/36 |
| 2009/0154928 A1* | 6/2009 | Shin | G02B 6/12016 | 398/79 |
| 2010/0247037 A1* | 9/2010 | Little | G02B 6/12007 | 385/28 |
| 2013/0223791 A1* | 8/2013 | Okayama | G02B 6/354 | 385/16 |
| 2013/0322813 A1* | 12/2013 | Grondin | B82Y 20/00 | 385/14 |

* cited by examiner

WAVELENGTH COMBINER UNIT AND ARRAYED WAVEGUIDE GRATING HAVING THE SAME

CROSS-REFERENCE TO RELATED APPLICATIONS

This U.S. non-provisional patent application claims priority under 35 U.S.C. §119 of Korean Patent Application No. 10-2015-0015277, filed on Jan. 30, 2015, the entire contents of which are hereby incorporated by reference.

BACKGROUND

The present disclosure herein relates to a wavelength combiner and an arrayed waveguide grating (AWG) having the same, and more particularly, to a wavelength and having a rib waveguide and an AWG.

In the fields of optical communication and photonic integrated circuit (PIC), an optical device for the muxing/demuxing of a signal may include an arrayed waveguide grating (AWG), Echelle grating, ring filter or Mach-zehnder interferometer. Among others, the AWG is a wavelength division multiplexer (WDM) device that is being most widely used. In the field of AWG, an AWG that is based on silica and an AWG that is based on silicon (Si) or indium phosphide (InP) having a higher refractive index than the silica are being researched.

When a material having a high refractive index is used, the size of an AWG device may decrease because a radius of curvature minimizing light loss decreases. The input loss of a general AWG is about 3 dB. Since a silicon AWG has a large coefficient of expansion, it shows a characteristic that the output spectrum of the AWG is sensitive to temperature. Thus, there is a need for the silicon AWG to be designed to operate irrespective of temperature. To this end, when the AWG is designed, it is general to make the output spectrum of the AWG flat so that an output is constant, even when temperature varies and thus the wavelength of the output spectrum varies.

SUMMARY

The present disclosure provides a wavelength combiner that may optically combine a plurality of wavelengths and gives single mode output, and an arrayed waveguide grating having the same.

An embodiment of the inventive concept provides a wavelength combiner includes a slab waveguide; an output waveguide extended from the slab waveguide in a first direction; and at least one rib waveguide disposed at an interval horizontally from the output waveguide and extended from the slab waveguide in the first direction, wherein the sub rib waveguide is tapered in the first direction, asymmetrically.

In an embodiment, the sub rib waveguide may be provided in plurality, and the sub rib waveguides may be disposed at both sides of the output waveguide with different numbers.

In an embodiment, the sub rib waveguides disposed at one side of the output waveguide may be different from one another in length in the first direction.

In an embodiment, the sub rib waveguide may be provided in plurality, and the sub rib waveguides may be symmetrically disposed at both sides of the output waveguide.

In an embodiment, the sub rib waveguides may be provided at both sides of the output waveguide with same numbers, and the rib waveguides longer in length in the first direction among the rib waveguides may be disposed adjacent to the output waveguide.

In an embodiment, a side of the rib waveguide to which the output waveguide is adjacent may be extended to be in a straight line and an opposite side of the rib waveguide may be tapered. In an embodiment, the output waveguide and the sub rib waveguide may be silicon having a height of about 0.22 μm, wherein a length of the sub rib waveguide may be about 40 μm, a height of the output waveguide and the sub rib waveguide may be about 0.15 μm, and a distance between the output waveguide and a secondary waveguide may be about 0.2 μm.

In an embodiment, the sub rib waveguide may include a linear portion extended in the first direction and a tapered portion connected to the linear portion and tapered in the first direction.

In an embodiment, the output waveguide and the rib waveguide may be silicon having a height of about 0.22 μm, wherein a length of the tapered portion may be about 40 μm, an etched height of the output waveguide and the rib waveguide may be about 0.15 μm, and a distance between the output waveguide and a secondary waveguide may be about 0.2 μm.

In an embodiment, a side of the tapered portion to which the output waveguide is adjacent may be extended to be in a straight line and an opposite side of the tapered portion may be tapered toward the output waveguide.

In an embodiment, the sub rib waveguide may be shorter in length than the output waveguide.

In an embodiments of the inventive concept, an arrayed waveguide grating (AWG) includes an arrayed waveguide; an input star coupler connected to one end of the arrayed waveguide and an output star coupler connected to an other end of the arrayed waveguide, wherein the output star coupler includes a slab waveguide, a plurality of output waveguides extended from the slab waveguide in a first direction and at least one sub rib waveguide disposed at an interval horizontally from each of the output waveguides and tapered in the first direction.

In an embodiment, the sub rib waveguide may be provided in plurality, and the sub rib waveguides may be disposed at both sides of the output waveguide with different numbers.

In an embodiment, the sub rib waveguides disposed at one side of the output waveguide may be different from one another in length in the first direction.

In an embodiment, the rib waveguide may be provided in plurality, and the rib waveguides may be symmetrically disposed at both sides of the output waveguide.

In an embodiment, the rib waveguides may be provided at both sides of the output waveguide with same numbers, and the rib waveguides longer in length in the first direction among the rib waveguides may be disposed adjacent to the output waveguide.

In an embodiment, the rib waveguide may include a linear portion extended in the first direction and a tapered portion connected to the linear portion and tapered in the first direction.

BRIEF DESCRIPTION OF THE FIGURES

The accompanying drawings are included to provide a further understanding of the inventive concept, and are incorporated in and constitute a part of this specification.

The drawings illustrate exemplary embodiments of the inventive concept and, together with the description, serve to explain principles of the inventive concept.

DETAILED DESCRIPTION

The effects and features of the inventive concept, and implementation methods thereof will be clarified through following embodiments to be described in detail with reference to the accompanying drawings. The inventive concept may, however, be embodied in different forms and should not be construed as limited to the embodiments set forth herein. Rather, these embodiments are provided so that the present disclosure is thorough and complete and fully conveys the scope of the present invention to a person skilled in the art to which the inventive concept pertains. Further, the inventive concept is only defined by scopes of claims. The same reference numerals throughout the disclosure refer to the same components.

Also, embodiments in the present disclosure are described with reference to ideal, exemplary cross sectional views and/or plan views of the inventive concept. The thicknesses of layers and regions in the drawings are exaggerated for the effective description of technical content. Thus, the forms of exemplary views may vary depending on fabrication technologies and/or tolerances. Thus, embodiments of the inventive are not limited to shown specific forms and also include variations in form produced according to fabrication processes. For example, an etch region shown in a rectangular shape may have a round shape or a shape having a certain curvature. Thus, regions illustrated in the drawings are exemplary, and the shapes of the regions illustrated in the drawings are intended to illustrate the specific shapes of the regions of devices and not to limit the scope of the inventive concept.

Figure 1:
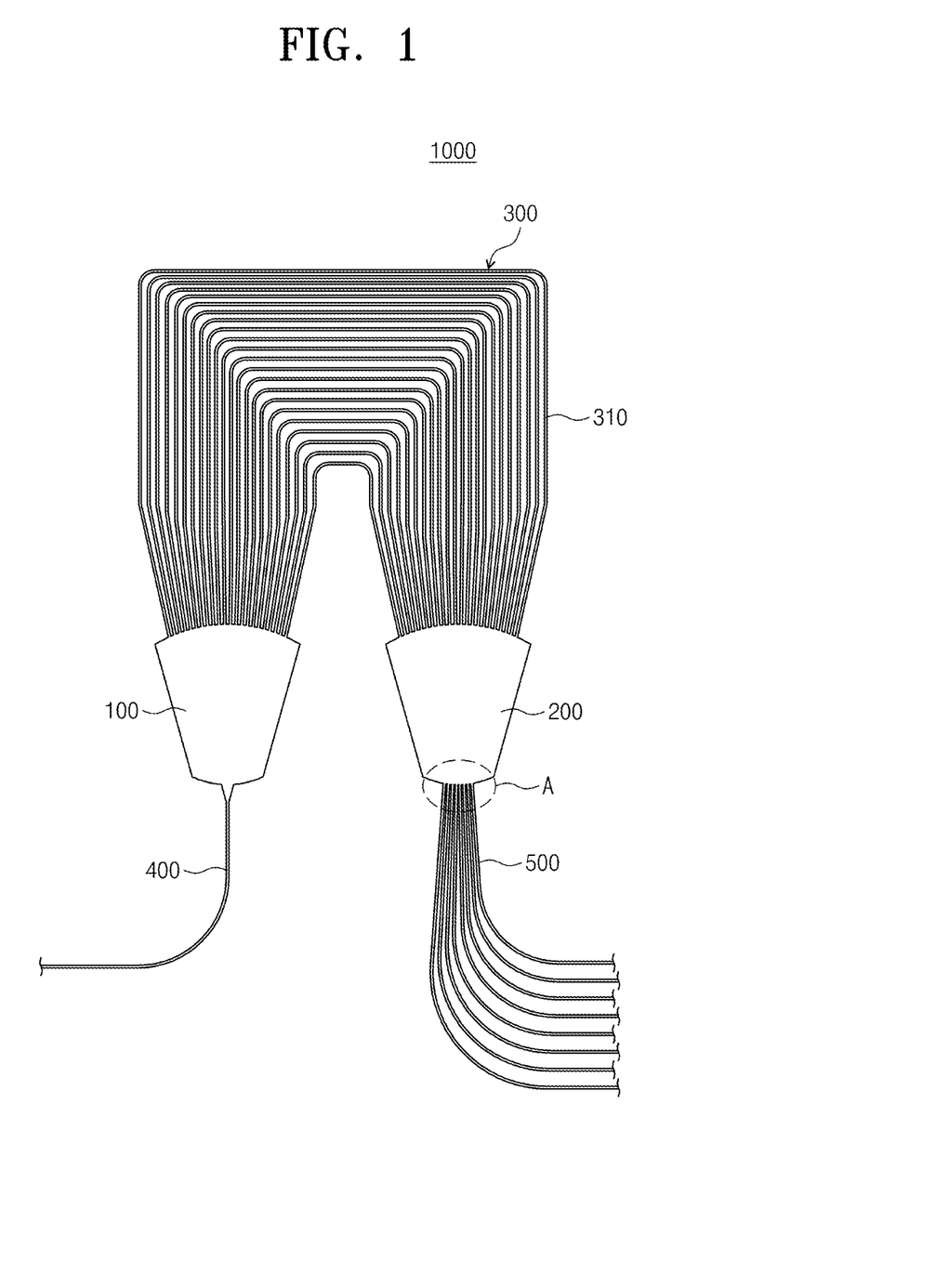
FIG. 1 is a plan view of an arrayed waveguide grating (AWG) according to an embodiment of the inventive concept.
Figure 2:
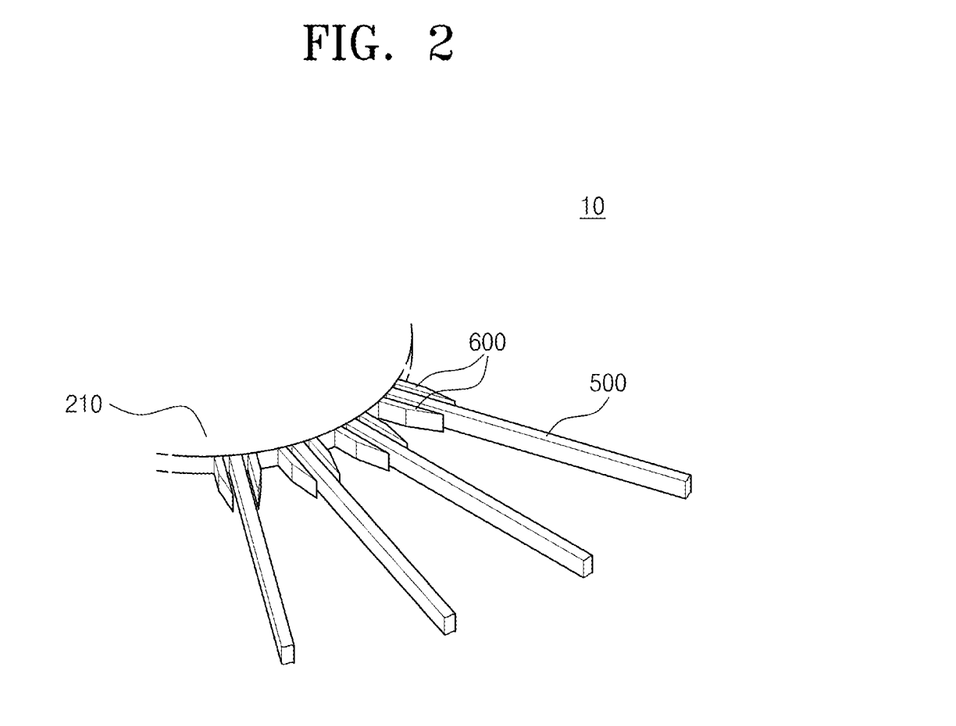
FIG. 2 is an enlarged view of dotted circle A in FIG. 1.

FIG. 1 is a plan view of an arrayed waveguide grating (AWG) according to an embodiment of the inventive concept, and FIG. 2 is an enlarged view of dotted circle A in FIG. 1.

Referring to FIGS. 1 and 2, an AWG 1000 may include an input star coupler 100, an output star coupler 200, an arrayed waveguide structure 300 and a wavelength combiner 10. The star input coupler 100 may be disposed at one end of the arrayed waveguide structure 300 and the output coupler 200 may be disposed at the other end of the arrayed waveguide structure 300. The input star coupler 100 and the output star coupler 200 may be disposed adjacent to each other. The input star coupler 100 may provide light to the arrayed waveguide structure 300.

The wavelength combiner 10 may include a slab waveguide 210, an output waveguide 500, and an sub rib waveguide 600. The slab waveguide 210 may transmit a signal transmitted from the arrayed waveguide structure 300, to the output waveguide 500 and the rib waveguide 600.

The arrayed waveguide structure 300 may include a plurality of arrayed waveguides 310. The length of each of the plurality of arrayed waveguides 310 may be different from one another. The arrayed waveguides 310 may be connected to between the input star coupler 100 and the output star coupler 200. The arrayed waveguides 310 may be curved. For example, the arrayed waveguides 310 may be curved to have a shape of the alphabet letter "U". The arrayed waveguides 310 may have a difference in length among them and the arrayed waveguide structure 300 may function as a diffraction grating. Thus, an optical signal output from the arrayed waveguides 310 may be focused on different locations according to the wavelength of the signal.

An input waveguide 400 may provide light to the input star coupler 100. The arrayed waveguide 310 may be connected to one side of the output star coupler 200 and output waveguides 500 may be connected to the other side of the output star coupler 200. The output star coupler 200 may perform de-multiplexing on optical signals according to a wavelength to output de-multiplexed signals to the output waveguides 500. When optical signals having different wavelengths enter the output waveguide 500, wavelength-multiplexed optical signals may be output from the input waveguide 400.

In this case, the AWG 1000 may be used for wavelength multiplexing and de-multiplexing.

Figure 3:
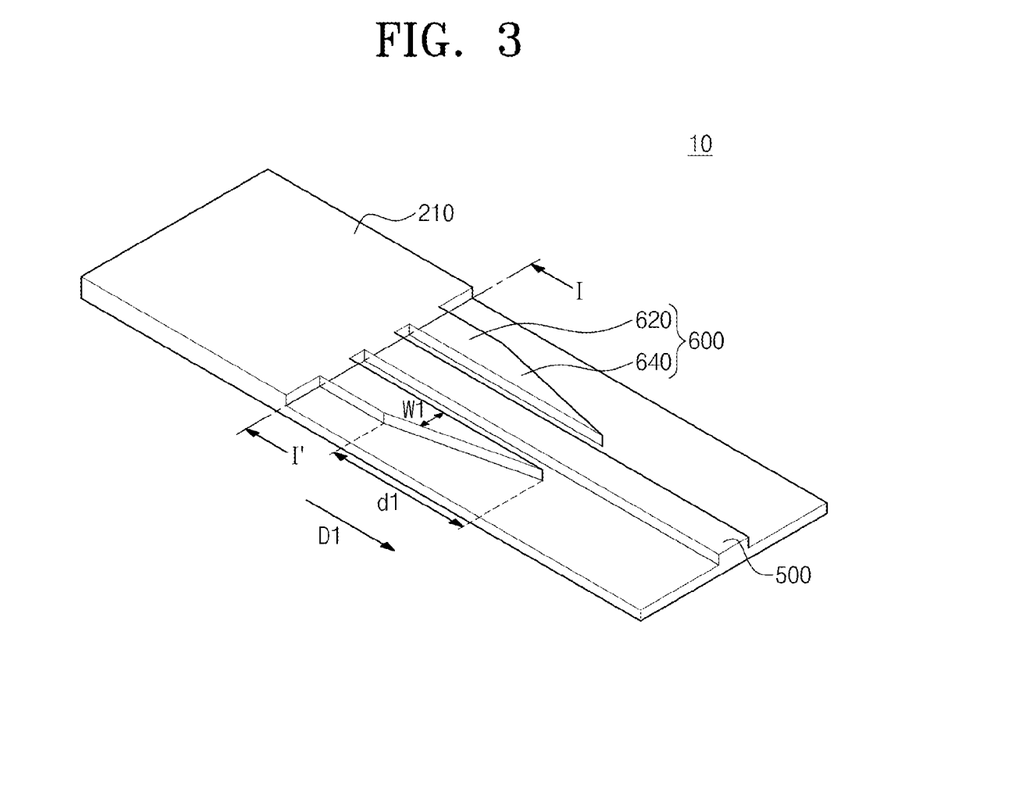
FIG. 3 represents a wavelength combiner according to an embodiment of the inventive concept.
Figure 4:
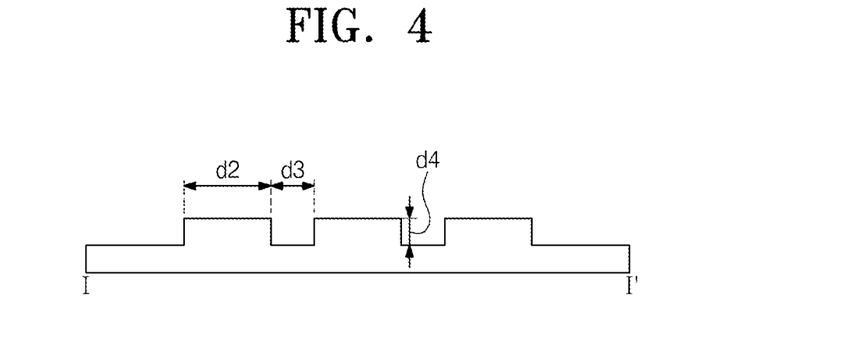
FIG. 4 is a cross-sectional view taken along line I-I' in FIG. 3.

FIG. 3 represents a wavelength combiner according to an embodiment of the inventive concept, and FIG. 4 is a cross-sectional view taken along line I-I' in FIG. 3.

Referring to FIGS. 3 and 4, the wavelength combiner 10 may include a slab waveguide 210, an output waveguide 500, and sub rib waveguides 600. The output waveguide 500 and the sub rib waveguides 600 may be extended from the slab waveguide 210 in a first direction D1. The first direction D1 is a direction connected from the slab waveguide 210 to the output waveguide 500. The length of the sub rib waveguides 600 may be shorter than that of the output waveguide 500 in the first direction D1. At least one or more sub rib waveguides 600 may be provided and disposed at opposite sides of the output waveguide 500. Each of the sub rib waveguides 600 may include a linear portion 620 extended with the uniform width in the first direction D1, and a tapered portion 640 connected to the linear portion 620 and tapered in the first direction D1. One side of the tapered portion 640 adjacent to the output waveguide 500 may be extended in a straight line and the other side of the tapered portion 640 may be tapered. In this case, the length of the tapered portion 640 is d1, the width of each of the sub rib waveguides 600 is d2, the distance between the output waveguide 500 and the sub rib waveguide 600 is d3 and the etched height of the output waveguide 500 and the sub rib waveguide 600 is d4. The etched height d4 of the output waveguide 500 and the sub rib waveguides 500 may be the same.

The wavelength combiner 10 may adjust the distance d3 between the output waveguide 500 and the sub rib waveguide 600, and the etched height d4 of the output waveguide 500 and the rib waveguide 600 to change a plurality of output wavelengths to form a single mode. When the etched height d4 of the output waveguide 500 and the sub rib waveguide 600 is higher than a certain level, light may not move between the output waveguide 500 and the sub rib waveguide 600. Also, when the distance d3 between the output waveguide 500 and the sub rib waveguide 600 is wider than a certain level, light may not move between the output waveguide 500 and the rib waveguide 600. Thus, it is possible to move light between the output waveguide 500 and the sub rib waveguide 600 by decreasing the distance d3 between the output waveguide 500 and the sub rib waveguide 600 when the etched height d4 of the output waveguide 500 and the sub rib waveguide 600 is great, and decreasing the etched height d4 of the output waveguide 500 and the sub rib waveguide 600 when the distance d3 between output waveguide 500 and the rib waveguide 600 is wide.

Also, when the etched height d4 of the output waveguide 500 and the sub rib waveguide 600 is lower than a certain level, light is not guided in the output waveguide and the sub waveguide 600, and spread. Thus, the etched height d4 of the output waveguide 500 and the rib waveguide 600 is required to have a height equal to or greater than a certain level.

Light transmitted to the sub rib waveguides 600 may be transmitted to the output waveguide 500 by passing through the tapered portion 640. When the width W1 of the tapered portion 640 is sufficiently small, optical mode of light may be not allowed and may move to the output waveguide 500 having a greater refractive index. Thus, a plurality of lights having different wavelengths may be coupled to be light having a single mode and a coupled wavelength may have a flat-top shape.

Figure 5:
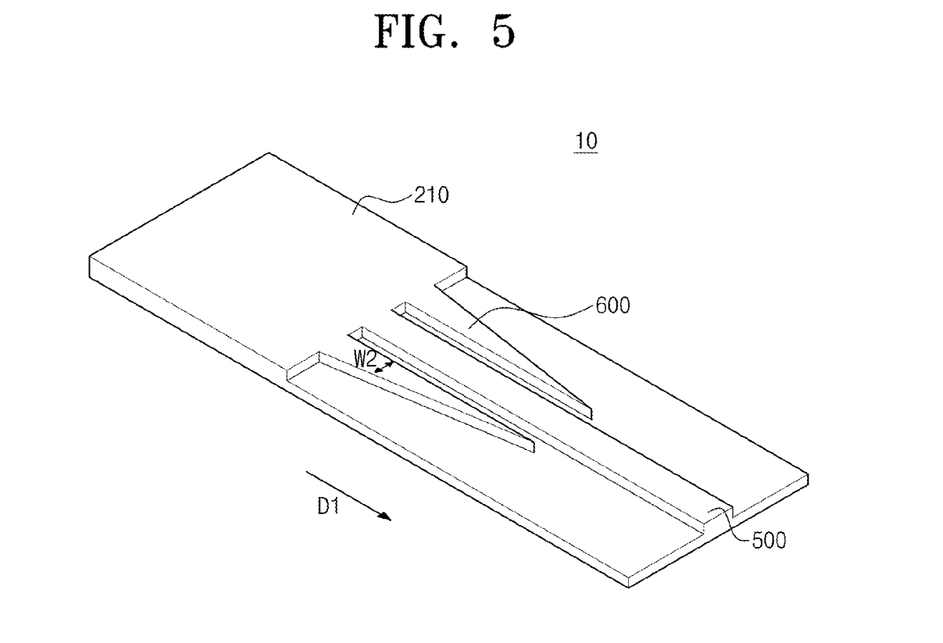
FIG. 5 represents a wavelength combiner according to an embodiment of the inventive concept.

FIG. 5 represents a wavelength combiner according to embodiments of the inventive concept.

Referring to FIG. 5, the sub rib waveguides 600 of the wavelength combiner 10 may be tapered from the slab waveguide 210 in the first direction D1. One side of the rib waveguide 600 adjacent to the output waveguide 500 may be extended in a straight line and the opposite side thereof may be tapered.

Light transmitted to the sub rib waveguides 600 may be transmitted to the output waveguide 500, passing through the sub rib waveguide 600. When the width W2 of each of the sub rib waveguides 600 is sufficiently small, optical mode of light may be not allowed and may move to the output waveguide 500 having a great refractive index. Thus, a plurality of lights having different wavelengths may be coupled to be light having a single mode and a coupled wavelength may have a flat-top shape.

Figure 6:
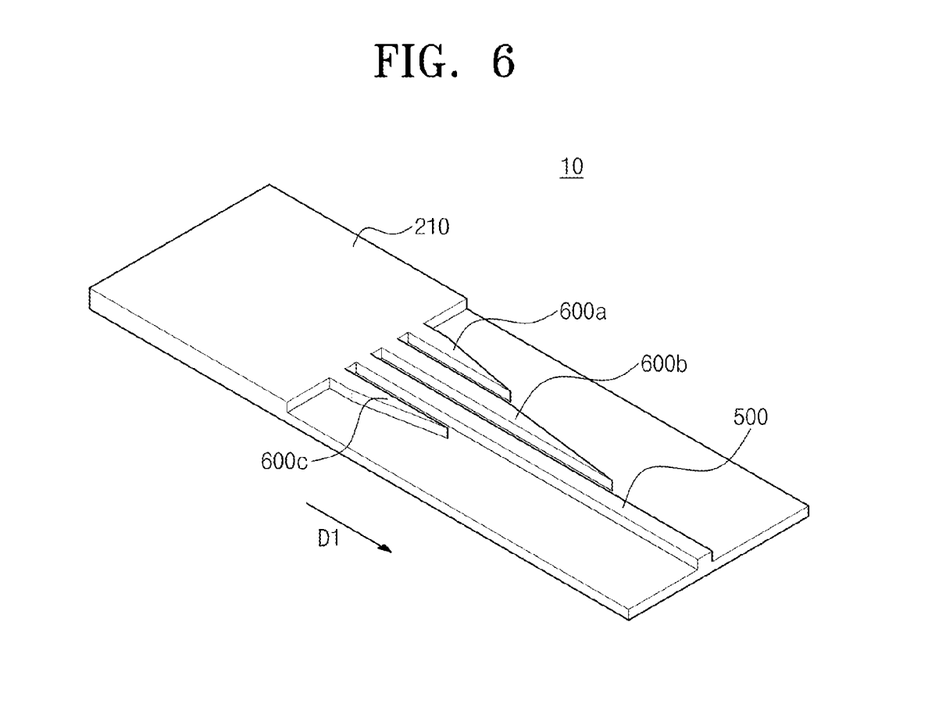
FIG. 6 represents a wavelength combiner according to an embodiment of the inventive concept.
Figure 7:
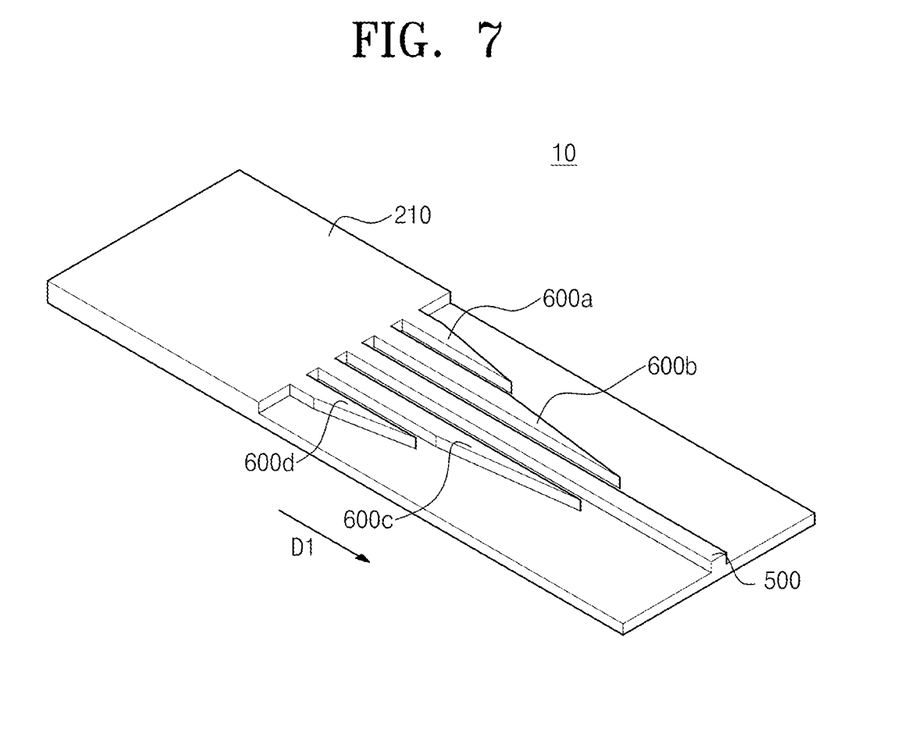
FIG. 7 represents a wavelength combiner according to an embodiment of the inventive concept.

FIGS. 6 and 7 represent a wavelength combiner according to embodiments of the inventive concept.

Referring to FIG. 6, the sub rib waveguides 600 may be provided in plurality and disposed at the both sides of the output waveguide 500 with different numbers. In the present embodiment, the sub rib waveguides 600 may include a first sub rib waveguide 600a, a second sub rib waveguide 600b, and a third sub rib waveguide 600c. The first sub rib waveguide 600a and the second sub rib waveguide 600b may be disposed at one side of the output waveguide 500 and the third sub waveguide 600c may be disposed at the other side thereof. The first sub rib waveguide 600a may be shorter in length than the second sub rib waveguide 600b. The first sub rib waveguide 600a and the third sub rib waveguide 600c may be mutually the same in length.

Light having a wavelength of λ1 may move in the first sub rib wavelength 600a, light having a wavelength of λ2 may move in the second sub rib waveguide 600b, light having a wavelength of λ3 may move in the output waveguide 500, and light having a wavelength of λ4 may move in the third sub rib waveguide 600c. When the width of the first rib waveguide 600a decreases during the movement of the light having the wavelength of λ1 in the first direction D1, the light having the wavelength of λ1 may move to the second sub rib waveguide 600b. The light having the wavelength of λ2 traveling in the second sub rib waveguide 600b and the light having the wavelength of λ1 may be coupled. When the light having the wavelength of λ1 and the light having the wavelength of λ2 are coupled and thus the width of the second waveguide 600b decreases, the light having the wavelength of λ1 and the light having the wavelength of λ2 may move to the output waveguide 500. In this case, the light having the wavelength of λ4 moving in the third sub rib waveguide 600c moves to the output waveguide 500 and may thus be coupled to the light having the wavelength of λ3. Thus, light having a wavelength obtained by coupling λ1, λ2, λ3, and λ4 may move in the output waveguide 500. That is, single-mode light may move in the output waveguide 500.

Referring to FIG. 7, the sub rib waveguides 600 may be provided in plurality and symmetrically disposed at the both sides of the output waveguide 500 with the same numbers. Sub Rib waveguides having longer length in the first direction D1 among the sub rib waveguides 600 may be disposed adjacent to the output waveguide 500. In the present embodiment, the sub rib waveguides 600 may include a first sub rib waveguide 600a, a second sub rib waveguide 600b, a third sub rib waveguide 600c, and a fourth sub rib waveguide 600d. The first sub rib waveguide 600a and the second sub rib waveguide 600b may be disposed at one side of the output waveguide 500 and the third sub rib waveguide 600c and the fourth sub rib waveguide 600d may be disposed at the other side thereof. The first sub rib waveguide 600a and the fourth sub rib waveguide 600d may be the same in length in the first direction D1. The second sub rib waveguide 600b and the third sub rib waveguide 600c may be the same in length in the first direction D1. The second sub rib waveguide 600b and the third sub rib waveguide 600c may be longer in length than the first sub rib waveguide 600a and the fourth sub rib waveguide 600d in the first direction D1.

Light having a wavelength of λ1 may move in the first sub rib wavelength 600a, light having a wavelength of λ1 may move in the second sub rib waveguide 600b, light having a wavelength of λ2 may move in the output waveguide 500, light having a wavelength of λ4 may move in the third sub rib waveguide 600c, and light having a wavelength of λ5 may move in the fourth sub rib waveguide 600d. When the width of the first sub rib waveguide 600a decreases during the movement of the light having the wavelength of λ1 in the first direction D1, the light having the wavelength of λ1 may move to the second sub rib waveguide 600b. The light having the wavelength of λ2 traveling in the second sub rib waveguide 600b and the light having the wavelength of λ1 may be coupled. When the light having the wavelength of λ1 and the light having the wavelength of λ2 are coupled and thus the width of the second sub rib waveguide 600b decreases, the light having the wavelength of λ1 and the light having the wavelength of λ2 may move to the output waveguide 500. The light having the wavelength of λ3 traveling in the third sub rib waveguide 600c and the light having the wavelength of λ4 traveling in the fourth sub rib waveguide 600d may also move to the output waveguide 500. Thus, light having a wavelength obtained by coupling λ1, λ2, λ3, λ4 and λ5 may move in the output waveguide 500. That is, single-mode light may move in the output waveguide 500.

Figure 8:
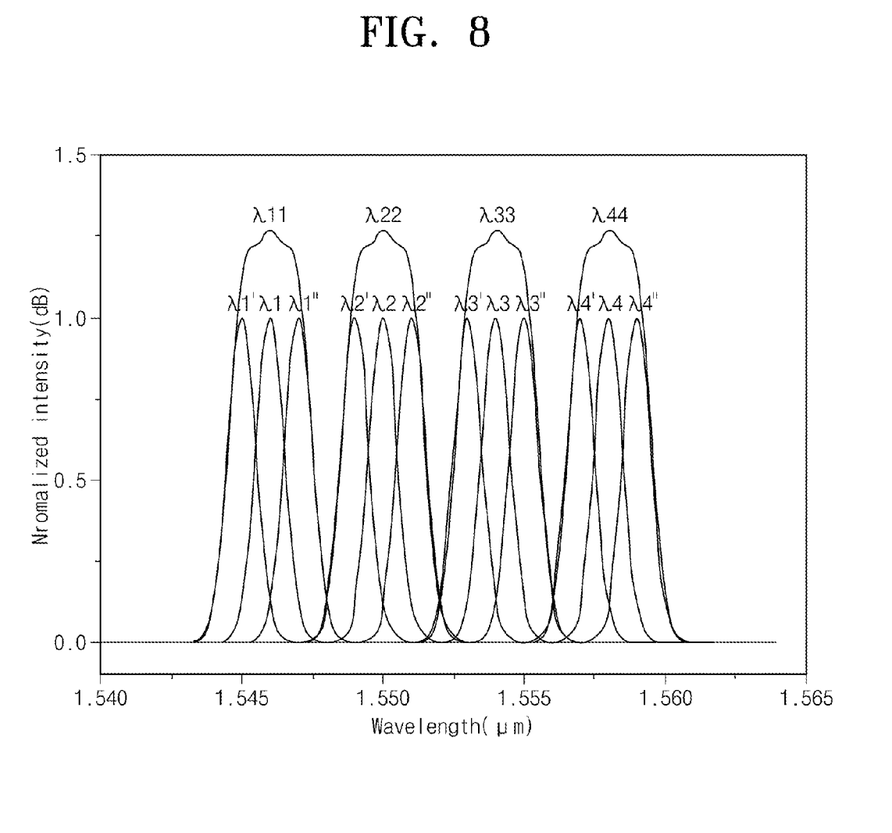
FIG. 8 is a graph of wavelengths output by a plurality of wavelength combiners of the inventive concept.

FIG. 8 is a graph of wavelengths output by a plurality of wavelength combiners of the inventive concept. The X axis is the wavelength of light and the y axis is the intensity of light.

Referring to FIGS. 3, 4, and 8, d1 may be about 40 µm, d2 may be about 0.5 µm, d3 may be about 0.2 µm, and d4 may be about 0.15 µm. The height of the output waveguide 500 and the rib waveguide 600 may be about 0.22 µm. In the present embodiment, four output waveguides 500 may be provided and two sub rib waveguides 600 may be provided to each output waveguide 500. Light having a wavelength of λ1 may enter one output waveguide 500, and light having wavelengths of λ1' and λ1" may enter two sub rib waveguides 600 disposed at an interval from the output waveguide 500. The light having the wavelengths of λ1' and λ1" moving along each sub rib waveguide 600 may move to the output waveguide 500. Thus, single-mode light having λ11 obtained by coupling light having wavelengths of λ1, λ1' and λ1" may move to one output waveguide 500. Also in other output waveguides 500, light moving along each sub rib waveguide 600 may move to the output waveguide. An output wavelength may have a flat-top shape as shown in graph.

According to an embodiment of the inventive concept, it is possible to optically combine a plurality of wavelengths to form a single mode in one waveguide and thus output a wavelength having a flat-top mode.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A wavelength combiner comprising:
   a slab waveguide;
   an output waveguide extending from the slab waveguide in a first direction; and
   first and second sub rib waveguides, each of the first and second sub rib waveguides being disposed at an interval from a corresponding side surface of the output waveguide and extending from the slab waveguide in the first direction,
   wherein each of the first and second sub rib waveguides includes a portion that is tapered in the first direction, the tapered portion having a first side surface that faces and is substantially parallel to the corresponding side surface of the output waveguide.

2. The wavelength combiner of claim 1, further comprising a third sub rib waveguide,
   wherein the first and third sub rib waveguides are disposed at one side of the output waveguide, and the second sub rib waveguide is disposed at the other side of the output waveguide.

3. The wavelength combiner of claim 2, wherein the first and third sub rib waveguides disposed at the one side of the output waveguide are different from each other in length in the first direction.

4. The wavelength combiner of claim 1, wherein the first and second sub rib waveguides are symmetrically disposed at both sides of the output waveguide.

5. The wavelength combiner of claim 4, further comprising third and fourth sub rib waveguides,
   wherein the first and third sub rib waveguides are disposed at one side of the output waveguide, and the second and fourth sub rib waveguides are disposed at the other side of the output waveguide, and
   wherein the first and second sub rib waveguides are longer in length in the first direction than the third and fourth sub rib waveguides, respectively, and the first and second sub rib waveguides are disposed closer to the output waveguide than the third and fourth sub rib waveguides.

6. The wavelength combiner of claim 1, wherein the tapered portion further has a second side surface that extends in a second direction intersecting with the first direction.

7. The wavelength combiner of claim 1, wherein each of the output waveguide and the first and second sub rib waveguides includes silicon and has a height of about 0.22 µm, and
   wherein a length of each of the first and second sub rib waveguides is about 40 µm, a height of each of the output waveguide and the first and second rib sub waveguides is about 0.15 µm, and the interval between the output waveguide and one of the first and second sub rib waveguides is about 0.2 µm.

8. The wavelength combiner of claim 1, wherein each of the first and second sub rib waveguides further includes a linear portion, the linear portion extending in the first direction and disposed between the tapered portion and the slab waveguide.

9. The wavelength combiner of claim 8, wherein each of the output waveguide and the first and second rib sub waveguides includes silicon and has a height of about 0.22 µm, and
   wherein a length of the tapered portion is about 40 µm, an etched height of each of the output waveguide and the first and second sub rib waveguides is about 0.15 µm, and the interval between the output waveguide and one of the first and second sub rib waveguides is about 0.2 µm.

10. The wavelength combiner of claim 8, wherein the tapered portion further has a second side surface that extends in a second direction intersecting with the first direction.

11. The wavelength combiner of claim 1, wherein each of the first and second sub rib waveguides is shorter in length than the output waveguide.

12. An arrayed waveguide grating (AWG) comprising:
    an arrayed waveguide;
    an input star coupler connected to one end of the arrayed waveguide; and
    an output star coupler connected to the other end of the arrayed waveguide,
    wherein the output star coupler comprises:
      a slab waveguide;
      an output waveguide extending from the slab waveguide in a first direction; and
      first and second sub rib waveguides, each of the first and second sub rib waveguides being disposed at an interval from a corresponding side surface of the output waveguide, and
    wherein each of the first and second sub rib waveguides includes a portion that is tapered in the first direction, the tapered portion having a first side surface that faces and is substantially parallel to the corresponding side surface of the output waveguide.

13. The arrayed waveguide grating (AWG) of claim 12, wherein the output star coupler further comprises a third sub rib waveguide, and
    wherein the first and third sub rib waveguides are disposed at one side of the output waveguide, and the second sub rib waveguide is disposed at the other side of the output waveguide.

14. The arrayed waveguide grating (AWG) of claim 13, wherein the first and third sub rib waveguides disposed at the one side of the output waveguide are different from each other in length in the first direction.

15. The arrayed waveguide grating (AWG) of claim 12, wherein
the first and second rib sub waveguides are symmetrically disposed at both sides of the output waveguide.

16. The arrayed waveguide grating (AWG) of claim 15, wherein the output star coupler further comprises third and fourth sub rib waveguides,
wherein the first and third sub rib waveguides are disposed at one side of the output waveguide, and the second and fourth sub rib waveguides are disposed at the other side of the output waveguide, and
wherein the first and second sub rib waveguides are longer in length in the first direction than the third and fourth sub rib waveguides, respectively, the first and second sub rib waveguides are disposed closer to the output waveguide than the third and fourth sub rid waveguides.

17. The arrayed waveguide grating (AWG) of claim 12, wherein each of the first and second sub rib waveguides further includes a linear portion, the linear portion extending in the first direction and disposed between the tapered portion and the slab waveguide.

* * * * *